Oct. 30, 1928.
W. F. HOERLE
1,690,071
JOINT FOR FOLDING RULES, ETC
Filed June 18, 1926
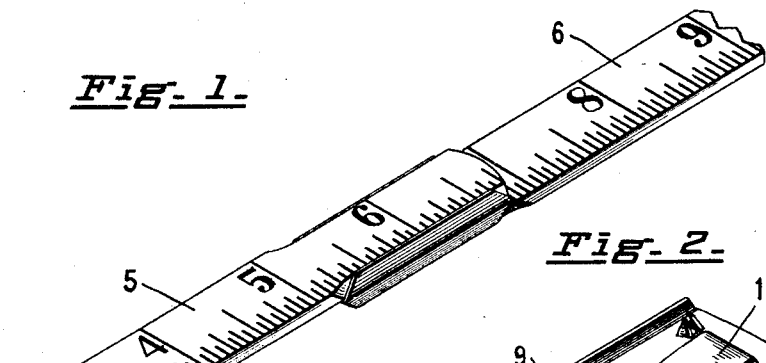
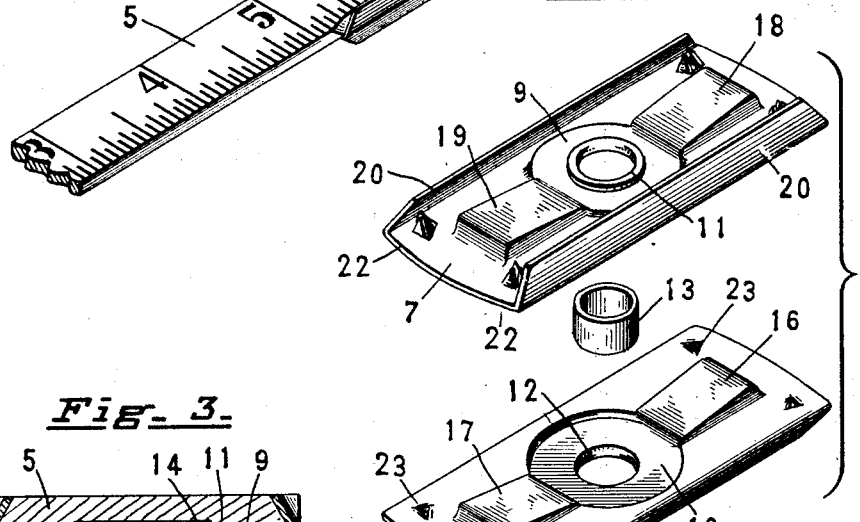
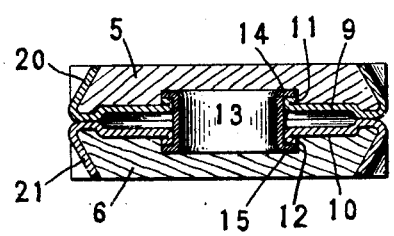
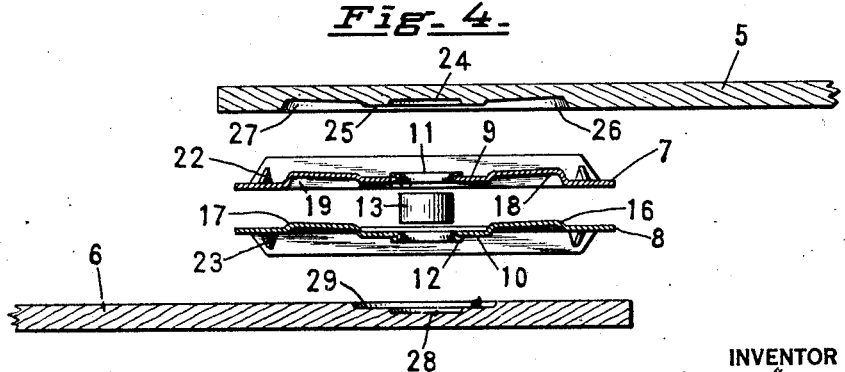
INVENTOR
William F. Hoerle,
BY
ATTORNEY Patented Oct. 30, 1928.

1,690,071

UNITED STATES PATENT OFFICE.

WILLIAM FERDINAND HOERLE, OF TORRINGTON, CONNECTICUT, ASSIGNOR TO UNION HARDWARE COMPANY, OF TORRINGTON, CONNECTICUT, A CORPORATION OF CONNECTICUT.

JOINT FOR FOLDING RULES, ETC.

Application filed June 18, 1926. Serial No. 116,848.

The main object of my invention is to provide a simple, inexpensive but effective joint for what are commonly termed folding rules. I specifically sought to provide a construction having a maximum degree of security with respect to the joint with a minimum weakening of the material of the rule.

Another object is to provide a form of joint which does not require perforation of the material of the rule.

Another object is to do away with the necessity of supplemental springs commonly employed in commercial devices of this character.

Another object is to provide a construction of this character which is inexpensive and yet durable.

In carrying out the invention I employ two sheet metal members which are hinged together and provided with interfitting bosses and recesses at opposite ends and with intervening resilient diaphragm portions which are connected by a tubular rivet serving as the hinge.

Fig. 1 is a perspective view of two sections of a folding rule with a joint embodying one form of my invention.

Fig. 2 is a perspective view showing the three separate parts of the preferred form of joint on a large scale.

Fig. 3 is a transverse sectional view of the same.

Fig. 4 is a longitudinal sectional view showing the parts of the joint and adjacent fragments of the rule sections separated.

The rule sections 5 and 6 may be of any suitable material and of course it will be understood that the rule may have any number of sections and be marked according to any desired scale of measurement.

The joint members 7 and 8 are formed of sheet metal of a resilient character such as brass or sheet steel. These are provided with centrally perforated diaphragm portions 9 and 10, preferably with the inner edges rolled over at 11 and 12, respectively, to reinforce the same. The tubular rivet 13 is employed to connect these two members 7 and 8 and serves as a hinge or pivot for the parts, the ends of the tubular rivet being curled over or upset at 14 and 15 around the reinforced edges 11 and 12. The opposite ends of one member are provided with projecting bosses such as 16 and 17, which are preferably tapered toward the center and merge into the edges of the diaphragm 10. The shape of these bosses is preferably substantially as shown, although this is not critical to the invention, as they may be circular or elongated or triangular in outline. The other member is bossed in the opposite direction so as to provide recesses 18 and 19 corresponding in shape and location with the bosses 16 and 17, and adapted to receive the same when the rule sections are either extended or folded up. The walls of the recesses 18 and 19 merge into the wall of the diaphragm 9. The joint members may be secured to the rule sections in any suitable manner, preferably by flanges such as 20 and 21 turned over and gripping the edges of the sections 5 and 6. The members 7 and 8 may also be provided with prongs such as 22 and 23 which may be imbedded in the material of the rule sections so as to prevent the sections from shifting longitudinally with respect to the joint.

It will be seen that this hinged joint has no projecting pin or pivot requiring to extend through the rule sections, and it is, therefore, possible to carry the scale markings and numbers across the joint without interruption. The formation of joint also entails a minimum weakening of the joint sections, for instance, the member 5 requires a shallow recess 24 for the end of the rivet 13, a shallower recess 25 of larger diameter for the diaphragm 9, and recesses 26 and 27 for the bosses which finish the recesses 18 and 19. The other rule section 6 merely requires a central recess 28 for the lower end of the rivet 13 and a shallower recess 29 of larger diameter for the diaphragm 10.

When the parts are assembled and the rule sections are to be folded or unfolded, the rotation of the joint members is resisted by the interlocking of the bosses 16 and 17 with the recesses 18 and 19. The diaphragms 9 and 10, and the bosses adjacent thereto warp as the joint members are forced to rotate one with respect to the other. Thus the material of the joint members furnish the necessary resiliency or spring action required for holding the parts securely in position, whether folded or unfolded.

I claim:

1. A folding rule joint comprising two sheet metal members centrally perforated and provided with warping sections with beaded edges around said perforations and inclined bosses and recesses at opposite ends and a separately formed tubular rivet upset at its opposite ends over said beaded edges.

2. A joint for a folding rule, etc., comprising sheet metal members having resilient perforated diaphragms offset from the plane of said members with inter-fitting bosses and recesses and a rivet having its ends upset to connect said diaphragms.

3. A folding rule joint comprising non-perforated rule sections recessed on their adjacent faces and sheet metal joint members secured to the adjacent faces of said rule sections, said joint members being provided with diaphragm portions seated in said recesses and also provided with a central rivet connecting said diaphragm portions and entirely housed within said recesses, said joint members also having inter-fitting bosses and recesses.

4. A folding rule joint comprising two sheet metal members having centrally located resilient warping diaphragms offset from the plane of said members, and provided with interfitting wedge shaped bosses and recesses tapered into the edges of said diaphragms, and a rivet connecting said members.

5. A joint for a folding rule, etc., comprising sheet metal members having resilient perforated diaphragms offset from the plane of said members in opposite directions, provided with interfitting bosses and recesses, and a rivet having its end upset to connect said diaphragms.

WILLIAM FERDINAND HOERLE.